United States Patent [19]

Dehn

[11] Patent Number: 4,958,439
[45] Date of Patent: Sep. 25, 1990

[54] METHOD AND DEVICE FOR ALIGNING VEHICLE FRAME

[76] Inventor: Freddie H. Dehn, R.R. 2, Ray County, Mo.

[21] Appl. No.: 444,005

[22] Filed: Nov. 30, 1989

[51] Int. Cl.$^5$ .............................................. G01B 5/25
[52] U.S. Cl. ........................................ 33/608; 33/339;
   33/645; 33/533; 33/413; 33/DIG. 1
[58] Field of Search ............. 33/608, 339, 645, 533,
   33/413, 286, 288, DIG. 1, 756

[56] References Cited

U.S. PATENT DOCUMENTS

| | | | |
|---|---|---|---|
| 1,531,652 | 3/1925 | Guillet | 33/413 |
| 2,788,584 | 4/1957 | Adrien | 33/413 X |

OTHER PUBLICATIONS

"Wheel Force"; V. L. Churchill; Mar. 1986.

*Primary Examiner*—Harry N. Haroian
*Attorney, Agent, or Firm*—Kokjer, Kircher, Bradley, Wharton, Bowman & Johnson

[57] ABSTRACT

A method and apparatus for determining the extent of damage to a vehicle body prior to its repair includes first and second means to be coupled with the vehicle body for holding a first string in spaced relationship to the body. First string means is coupled with the first and second string holding means and drawn taut. Third and fourth means adapted to be coupled with the vehicle body on the opposite side from the location of the first and second means is adapted to hold a second string in spaced relationship to the vehicle body. A second string means is drawn taut between the third and fourth holding means. Comparative measurements are then taken between the first string and the undamaged area of the vehicle body which corresponds to the damaged area on the opposite area. Second measurements are taken between the second string and the damaged area of the vehicle body and compared with the first measurements. The amount of damage to the body can then be determined by this comparison.

15 Claims, 2 Drawing Sheets

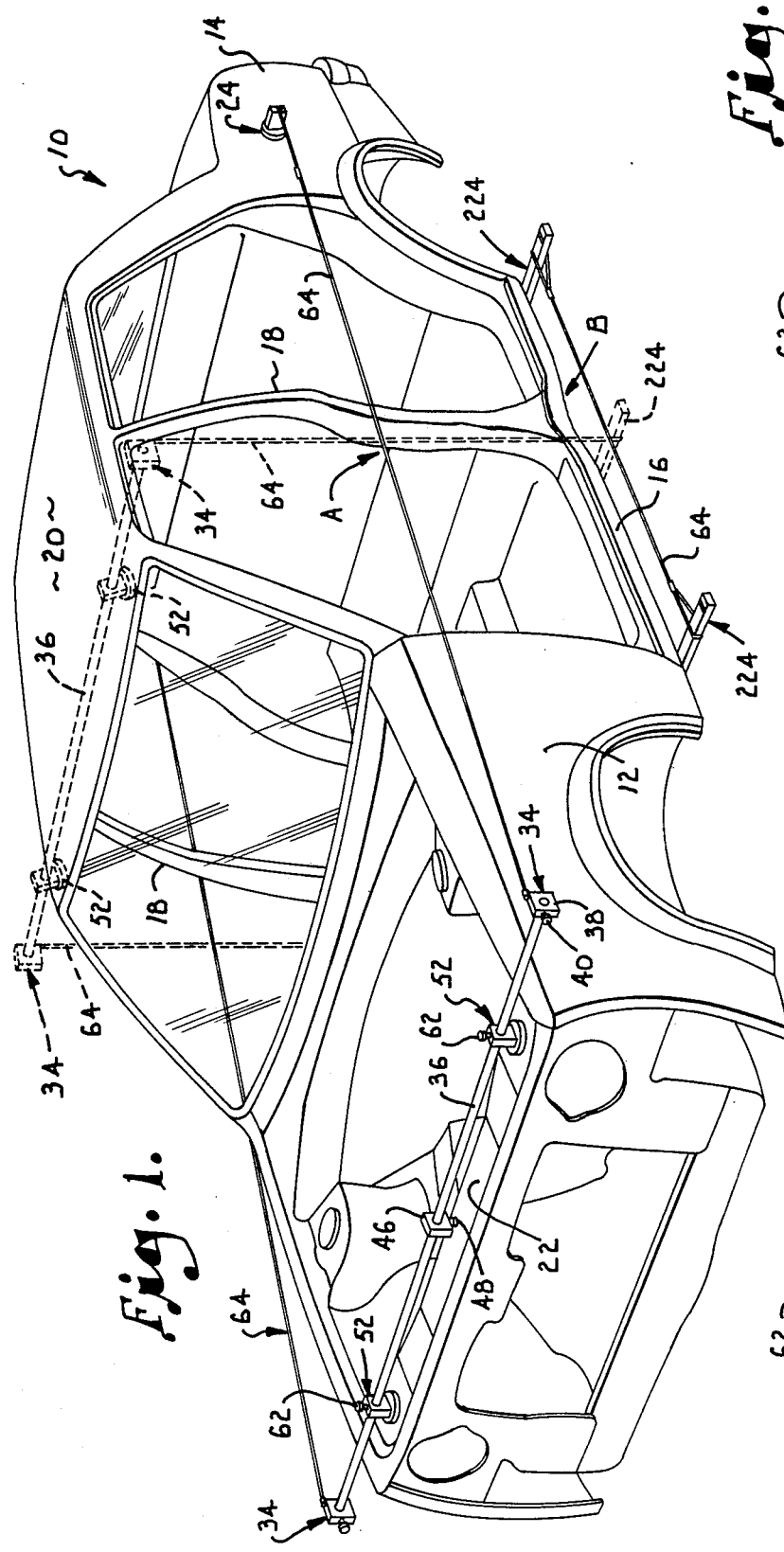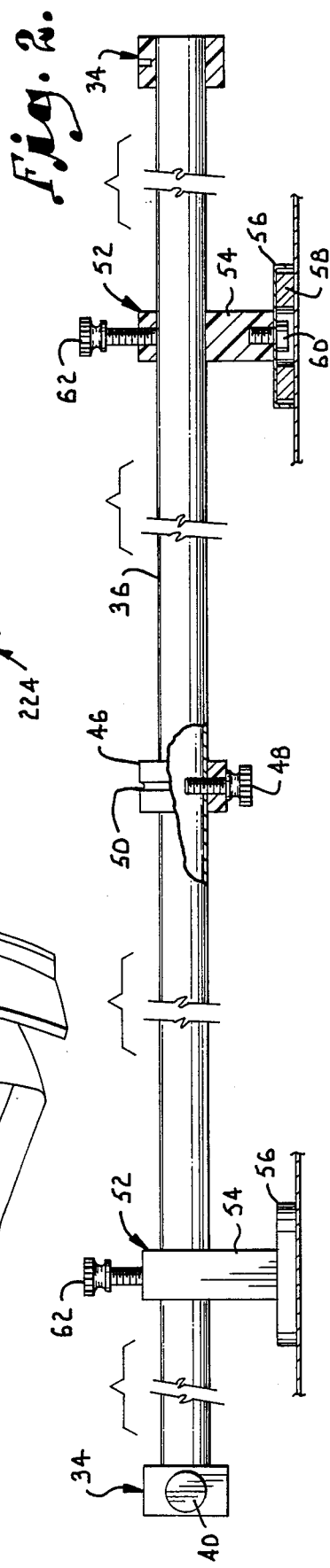

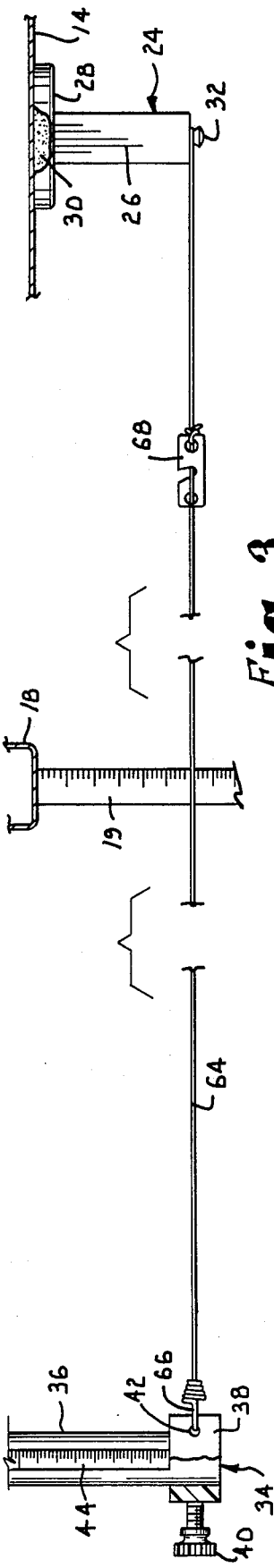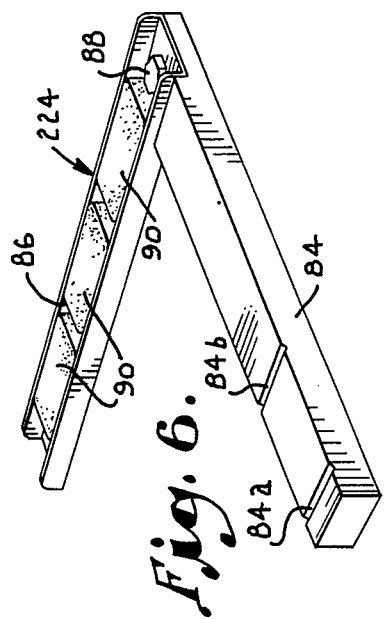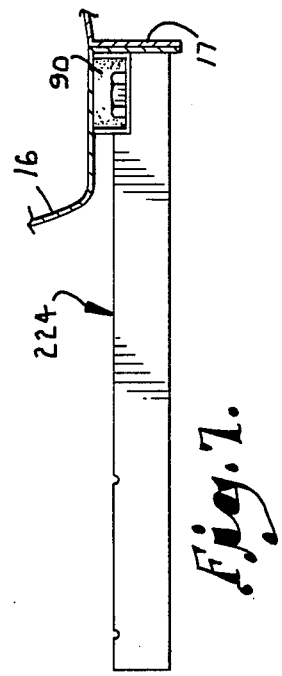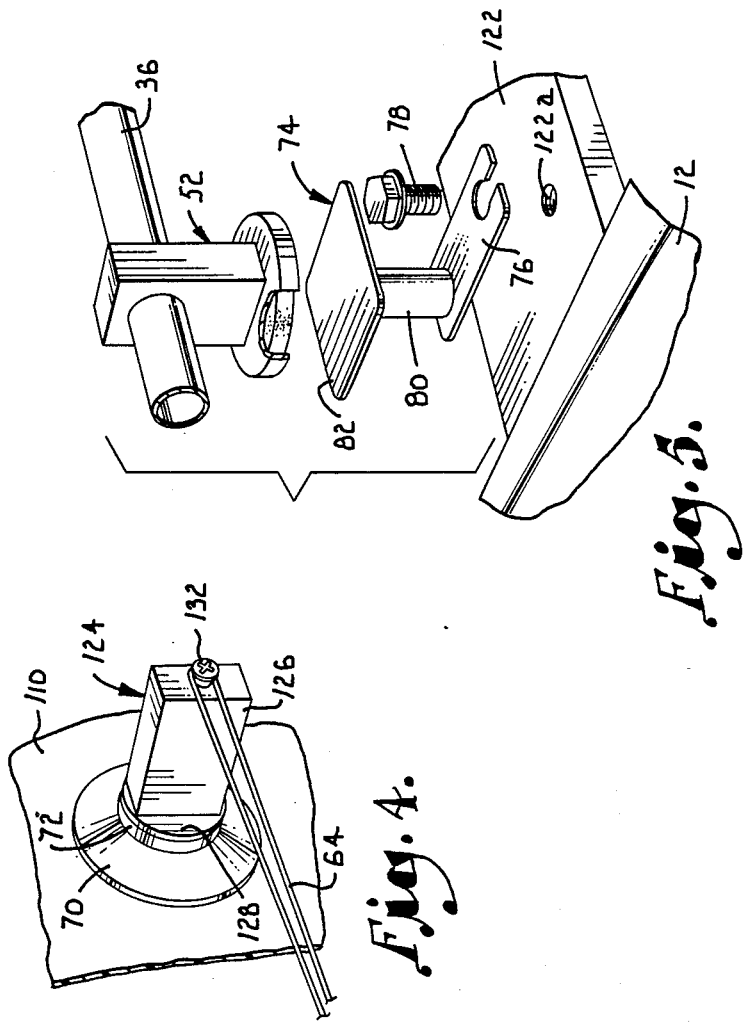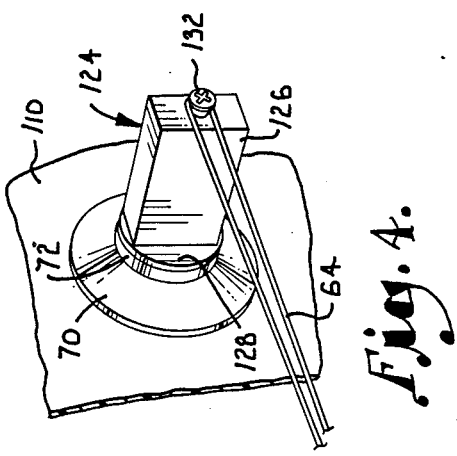

METHOD AND DEVICE FOR ALIGNING VEHICLE FRAME

This invention relates generally to automotive vehicle repair and, more particularly, to a method and for use in straightening damaged areas of a vehicle body.

It has long been the practice when automotive vehicles are damaged in collisions to straighten the vehicle frame if possible so that it can be repaired and safely driven again. In recent years, automobiles have generally been constructed with so-called "unibody" frames where the body of the car is integral with and a part of the framework rather than having a separate distinct frame on which the body is mounted. Unibody construction requires that very close tolerances be observed in the repair of damage to the vehicle body.

There are two basic approaches to determining the extent of damage to a unibody vehicle for the purpose of accurately repairing the damage. The most popular is to utilize a laser beam which is mounted on an undamaged portion of the vehicle body and is used to provide a highly accurate line from which measurements can be taken to determine the extent of the damage. Typically, a laser source is mounted on both the damaged and undamaged sides of the vehicle body and measurements from the laser beam to the body are taken from these two sides. The difference between the two measurements represents the extent of damage to the damaged side of the vehicle. Power equipment is then employed to move the damaged section the correct distance to bring it back to its original position within two or three millimeters of the design specifications. While the laser beam is highly accurate, it is very expensive, requires highly trained, skilled workers to operate it, and presents some danger to workers if it is used improperly. A laser is also expensive to repair or replace when this becomes necessary.

The second approach to determining the extent of damage in unibody vehicles is to employ a jig arrangement which is mounted beneath the vehicle and relies upon holes placed in the vehicle framework by the manufacturer for determining the extent of damage and the distance a damaged section of the vehicle must be moved to bring it back into proper alignment. These jig systems are also very expensive, require that the vehicle be raised a relatively high distance above the work surface, and the actual diagnosis of the extent of damage be done by a worker positioned beneath the vehicle.

The jig system referred to above is expensive, generally not as accurate as the laser system described above, and is awkward to work with because of its location relative to the vehicle.

It is therefore a primary object of the present invention to provide a method and apparatus for measuring the extent of damage to a vehicle frame which provides for accuracy in diagnosis which is comparable to that of a laser beam and superior to that of a jig system but at a small fraction of the cost of either of these prior art devices and methods.

It is also an objective of the present invention to provide a method and apparatus for determining the extent of damage to a vehicle frame which does not utilize lasers or other high maintenance cost components but is a simple mechanical system that requires little maintenance and what maintenance is required is a fraction of the cost of maintaining a comparable laser system.

It is also an important aim of my invention to provide a method and apparatus for determining the extent of damage to a vehicle body which does not present any danger to workers who are using the apparatus of carrying out the method.

An important aim of the invention is to provide a method and apparatus for determining the extent of damage to a vehicle body which requires less training of workers to utilize and thus lower skills than is required with lasers or jig systems.

Still another one of the objects of this invention is to provide a method and apparatus for determining the extent of damage to a vehicle body the proper use of which can be easily verified by an insurance adjuster to whom a damage estimate has been given.

Another very important object of this invention is to provide a method and apparatus which satisfies the foregoing aims and objects and is also particularly adapted for use on late model cars which, because of their aerodynamic shape, have fewer flat surfaces and distinct edges than older vehicles.

Other objects of the invention will be made clear or become apparent from the following description and claims when read in light of the accompanying drawing, wherein:

FIG. 1 is a perspective view of a vehicle body on which the apparatus of the present invention has been employed to determine the extent of damage to the body;

FIG. 2 is an elevational view with portions broken away and shown in cross-section to provide details of construction of one of the components of the diagnostic equipment of the present invention;

FIG. 3 is a fragmentary top plan view showing use of the apparatus of the invention when it is installed on a vehicle body;

FIG. 4 is a perspective view of an alternative form of mount for the standoff blocks which form a component of the present invention;

FIG. 5 is an exploded perspective view of another alternative means for mounting the standoff blocks which form a part of the present invention;

FIG. 6 is a perspective view of another alternative form of string mounting means for use in the present invention; and FIG. 7 is an elevational view of the string holder of FIG. 6 as it appears in place beneath the rocker panel of a vehicle body.

Referring initially to FIGS. 1 and 2, a vehicle body is designated generally by the numeral 10. Vehicle body 10 has two front quarters 12 (only one of which is fully visible in FIG. 1), two rear quarters 14 (only one of which is fully visible in FIG. 1), and two rocker panels 16 (only one of which is visible in FIG. 1). Extending upwardly from rocker panels 16 are center support pillars 18 which are integral with a roof panel 20. A radiator support 22 at the front of body 10 extends between the front quarters 12 and supports the radiator (not shown) for the vehicle engine (also not shown). It is to be noted that vehicle body 10 as shown in FIG. 1 has damage at a first area A to center support pillar 18 and additional damage at area B of rocker panel 16.

The apparatus of the present invention comprises first and third string holders 24, one of which is shown in detail in FIG. 3. Each string holder 24 comprises a standoff block 26 that is rigidly mounted to a base member 28 having a magnet 30 rigid therewith. Extending from the end of block 26 which is opposite the end to which base member 28 is secured is a pin 32.

Second and fourth string holders 34 are mounted on a rod 36 which is positioned at the front end of vehicle body 10. Referring to FIGS. 1 and 3, each string holder 34 comprises a block 38 which threadably receives a set screw 40 and has an opening 42 adjacent one side. The position of the block 38 relative to rod 36 is variable by virtue of the fact that the block is apertured so as to be slidable on the rod and is held in place in a desired position by set screw 40.

Rod 36 includes a calibrated ruler 44 along its uppermost horizontal surface (see FIG. 3). Rod 36 also has a center line positioning block 46 which is immovably secured to the rod by a threaded screw 48 (see FIG. 2). Block 46 has a center groove 50 which precisely designates the center point of the elongated rod.

Rod 36 is mounted on radiator support 22 by identical first and second mounting devices designated generally by the numeral 52. Each rod mounting device comprises a generally rectangular block 54 which is rigid with a base plate 56 which in turn mounts a magnet 58. Block 54 threadably receives a screw 60 which holds base plate 56 rigid with the block and also threadably receives a set screw 62 which contacts rod 36 to hold the mounting device rigid relative to the rod. A first string 64 is provided with a hook 66 (FIG. 3) at one end and a cinch clamp 68 at the opposite end. String 64 is normally of a length sufficient to extend the entire length of vehicle body 10. A second string 64 is normally utilized in combination with the first string. Strings 64 are preferably made of a high strength elastic material.

When the apparatus of the present invention is utilized to determine the extent of damage at area A of vehicle body 10 so that the precise amount of straightening needed to bring the vehicle body into proper alignment can be done on center pillar 18, first string holder 24 is positioned on the undamaged side of the vehicle body in the exact manner illustrated in FIG. 1 for placement of the string holder on the rear quarter of the damaged side. Rod 36 is positioned on radiator support 22 and groove 50 is precisely aligned with the center of the vehicle. The second string holder which is mounted on rod 36 is located near the left front quarter 12 of the vehicle body, preferably the same distance from the body as the distance pin 32 is from rear quarter 14. A first string 64 is then pulled taut between first and second string holders 24 and 34. This is done by hooking hook 66 into opening 42 on second string holder 34 and then pulling cord 64, which is preferably made of elastic material, until the loop at the opposite end fits over pin 32. Cinch clamp 68 is then utilized to bring the string taut with the desired amount of tension. First string 64 is located a given distance from the centerline of the vehicle body. This distance is directly proportional to the distance between first string 64 and the vehicle body.

Third and fourth string holders 24 and 34 are then placed on the vehicle body in positions corresponding to the same respective positions of first and second string holders 24 and 34 on the undamaged vehicle side. As clearly shown in FIG. 1, the third and fourth string holders are positioned so that, when string 64 is pulled taut between them, it will cross the damaged area A. String 64 on the undamaged side crosses a corresponding area. It is, of course, important that second string 64 be located the same distance from the vehicle body centerline as first string 64. This is accomplished by using third string holder 24 which is identical in construction to first string holder 24 and by positioning second and fourth string holders in exactly the same position on rod 36. Next, a measurement is taken utilizing ruler 19 (FIG. 3) to determine the distance between string 64 on the undamaged side and the undamaged center support pillar 18 at the area corresponding to area A on the damaged side. The distance between string 64 on the damaged side to the damaged area A is then measured utilizing ruler 19 and the two measured distances are compared to determine the extent of the damage. The difference between the measurement on the damaged side versus the measurement from the undamaged side will indicate the distance which center pillar 18 must be moved to bring the vehicle body back into alignment.

It should be understood that, if a preliminary examination of vehicle body 10 reveals no damage to either of the front quarters 12, second and fourth string holders, identical to first and third string holders 24, may be secured directly to the front quarters rather than utilizing string holders 34 mounted on rod 36. Use of the string holders 34 mounted on the rod is desirable, however, if there is any possible damage to at least one of the front quarters (and assuming there is no damage to radiator support 22). It is also within the scope of the invention to utilize two rods 36, one at the front and one at the rear of the damaged vehicle body with all string holders being of the same construction as string holder 34 and mounted on the rod. This approach will be taken when there is damage at both the front and rear of one side of the vehicle body.

Still another way in which the apparatus of the invention can be utilized when there is damage to both the front and rear quarters of one side of a vehicle body is to place rod 36 and string holders 34 in the positions illustrated in FIG. 1 and utilize string holders 224 which will be described in detail hereinafter as the first and third string holders. In this instance, the first and third string holders 224 are positioned beneath the rocker panel 16 and first and second strings 64 are run at an angle as they are stretched between the respective string holders. Relative measurements are then taken in the same manner as previously described for the preferred embodiment.

An alternative embodiment for a string holder is illustrated in FIG. 4 and designated generally by the numeral 124. String holder 124 is identical to string holder 24 previously described but is modified to accommodate mounting on a vehicle body section 110 that is made of plastic or nonferrous metal. To this end, string holder 124 includes a suction cup 70 to which is permanently affixed a magnet 72 which receives the magnetic base 128. An elastic string 64 is looped around end pin 132 in the same manner as described for string holder 24. Utilization of this alternative embodiment of the invention is identical in all respects to the operation of the preferred embodiment previously described except for the method of attachment of the string holders 124 to the vehicle body via suction cups 70.

Another alternative form of the invention is illustrated in FIG. 5. In this embodiment, a radiator support 122 extends between front quarters 12 and is recessed beneath the upper edge of the front quarters to such an extent that there is not adequate clearance for rod 36. In this case, optional brackets 74 are provided. Each bracket 74 includes a horizontal leg 76 through which threaded screw 78 is received before passing through an opening 122a in the radiator support. A vertical leg 80 is rigid with leg 76 and mounts a platform member 82 which is designed to receive rod mounting device 52. Brackets 74 provide the additional height required for clearance of rod 36. Except for the need to install brackets 74 as aforedescribed, utilization of this alternative form of the invention is in all respects identical to the preferred embodiment previously described.

Another alternative embodiment for a string holder is illustrated in FIGS. 6 and 7 and is designated by the numeral 224. String holder 224 is of generally L-shaped configuration and includes first and second channel members 84 and 86 which are held perpendicular to each other by a nut and bolt assembly 88. Channel member 84 has first and second grooves 84a and 84b which traverse the shorter dimension, or width, of the member. Channel member 86 is inverted relative to member 84 and receives a plurality of magnets 90 which are permanently secured to the member.

String holder 224 is utilized to determine the extent of vehicle body damage in an area along rocker panel 16 such as the area designated by the letter B in FIG. 1. First and second string holders 224 are mounted beneath rocker panel 16 on the undamaged side with the string holder abutting a pinch weld 17 as illustrated in FIG. 7. As previously described for the preferred embodiment, the first and second string holders are positioned on the undamaged side of the vehicle body so that, when string 64 is pulled taut between them, it will cross an area of the undamaged side of the vehicle body that corresponds to the damaged area on the opposite side. The first and second string holders hold string 64 a given distance from the center of the vehicle body by virtue of the fact that they are of identical construction and are secured to an undamaged body portion. While first and second string holders are not visible in FIG. 1, it is to be understood that they are identical to and would be placed in the exact same position as shown in FIG. 1 for third and fourth string holders 224. The latter two string holders are positioned to hold a string 64 away from the damaged area B the same distance from the vehicle center line as the given distance first string 64 is from the vehicle center lie. Again, this is accomplished by virtue of the fact that all of string holders 224 are identical in construction and all are secured to an undamaged portion of the vehicle body.

A second string 64 is pulled taut between the third and fourth string holders and the distance between the damaged area of the vehicle and the second string is measured. The distance between the corresponding area on the undamaged side and the first string is also measured and the two distances are compared to determine the extent of damage at area B. Area B will be straightened by pulling it outward so that the distance between the body at this area and string 64 will be the same as the distance between the corresponding area and string 64 on the undamaged side.

It will be apparent from the foregoing description that the invention herein described encompasses a method of determining the extent of damage to a vehicle body which comprises locating an area on an undamaged side of said vehicle that is opposite from and corresponds to the damaged area and then placing first and second string holders on the body for holding a string in spaced relationship to the undamaged side, the string holders being positioned to hold the string in a straight line which crosses the area of the undamaged side that corresponds to the damaged area. The string is also located a given distance from the vehicle center line. A first elastic string is pulled taut between the first and second string holders. The method then contemplates the placing of third and fourth string holders on the vehicle body for holding a second string in spaced relationship to the damaged area, the third and fourth string holders being positioned to hold a second string away from the damaged area the same distance from the vehicle center line as the given distance for the first string. The third string holder is positioned on the damaged side of the vehicle body at the exact same location corresponding to the location of the first string holder on the undamaged side. Similarly, the fourth string holder is placed on the damaged side in the exact same location as that of the second string holder on the damaged side. A second elastic string is pulled taut between the third and fourth string holders. The distance between the damaged area of the vehicle body and the second string is then measured followed by measuring the distance between the corresponding area on the undamaged side of the vehicle body and the first string. It is, of course, arbitrary as to which distance is measured first. The two measurements are then compared to determine the extent of damage on one side so that the distance which the damaged portion must be moved to bring it into alignment will be known.

When the apparatus of the invention is utilized to measure the extent of damage to roof panel 20, first, second, third and fourth string holders are placed on the vehicle in the same manner as previously described in conjunction with determining the extent of damage to center support pillar 18 in FIG. 1. The first and second strings 64 attached to these properly positioned string holders provide a vertical reference point for determining the proper vertical height of the roof panel. In addition, two more pairs of string holders are needed and these are shown in broken lines in FIG. 1. Fifth and seventh string holders 224 are positioned beneath rocker panel 16 in the manner illustrated in FIG. 1. Sixth and eighth string holders 34 are mounted on rod 36 which is held in place on roof panel 20 by rod mounting devices 52. A third string 64 extends between fifth and sixth string holding means 34 and 224 on the undamaged side of the vehicle body and a fourth string 64 extends between seventh and eighth string holders 34 and 224 on the damaged side of the vehicle body. Although no damage is indicated to roof panel 20 in FIG. 1, it is to be understood that the mounts 52 for rod 36 as well as string holders 224 must all be positioned on undamaged areas of the vehicle to assure accurate measurement.

Horizontal measurements are taken to determine the distance between fifth and sixth strings 64 and the adjacent roof area to determine the horizontal movement that is needed to bring the roof back into alignment. Vertical measurements are taken from the point where first and third strings 64 intersect to the undamaged area of roof panel 20 which corresponds to the damaged roof area on the opposite side of the vehicle. A second measurement is taken from the point of intersection of second and fourth strings 64 to the damaged area of the roof panel. These two measurements are compared to determine the vertical movement necessary to bring the roof panel into alignment.

It will be appreciated that the apparatus and method of the present invention can be employed for determining various types of vehicle body damage in addition to the specific examples referred to herein. The basic procedures are the same as aforedescribed, although in some instances the difference between two comparative measurements is halved and the vehicle body is moved the resulting distance so as to correct such conditions as sidesway.

From the foregoing, it will be seen that this invention is one well adapted to attain all the ends and objects hereinabove set forth as well as other advantages which are likely to become apparent upon utilization of the invention in commercial applications.

It will be understood that certain features and subcombinations of the invention disclosed are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

I claim:

1. Apparatus for determining the extent of damage to a vehicle body, said apparatus comprising:
   first and second means adapted to be coupled with said vehicle body on one side for holding a first string in spaced relationship to said body;
   first string means adapted to be drawn taut between said first and second holding means;
   third and fourth means for holding a second string in spaced relationship to said body and adapted to be coupled with said vehicle body on the opposite side from said one side at a location corresponding to the location of said first and second means on said one side; and
   second string means adapted to be drawn taut between said third and fourth holding means.

2. Apparatus as set forth in claim 1, wherein the damage to said vehicle is on said opposite side and said first and second means are positioned on said one side at either side of an area corresponding to said damaged area on the opposite side; said third and fourth means being positioned so that said second string means traverses said damaged area.

3. Apparatus as set forth in claim 1, wherein said first and second strings are comprised of an elastic material.

4. Apparatus as set forth in claim 1, wherein at least one of said first and second string holding means and at least one of said third and fourth string holding means comprises a magnetic base for coupling said holding means to a metal vehicle body.

5. Apparatus as set forth in claim 1, wherein at least one of said first and second string holding means and at least one of said third and fourth string holding means comprises a suction cup base for coupling said holding means to a nonmetallic vehicle body.

6. Apparatus as set forth in claim 1, wherein one of said first and second string holding means and one of said third and fourth string holding means are presented by an elongated rod that is mounted at an undamaged location on said vehicle and extends beyond the vehicle.

7. Apparatus as set forth in claim 1, wherein is included means for holding said first and second string means taut.

8. Apparatus as set forth in claim 1, wherein said damaged area comprises the roof of said vehicle, and wherein is further included fifth and sixth means adapted to be coupled with said vehicle at the roof and along one side of the vehicle, respectively, for holding a third string in spaced relationship to said body and generally perpendicular to said first string; seventh means adapted to be coupled with said vehicle at the roof in spaced relationship to said fifth means; and eighth means adapted to be coupled with said opposite vehicle side, both of said seventh and eighth means being for holding a fourth string in spaced relationship to said body on said opposite side and generally perpendicular to said second string.

9. Apparatus as set forth in claim 8, wherein said first, second, third and fourth string means all comprise an elastic material.

10. Apparatus as set forth in claim 9, wherein is included means for holding said third and fourth string means taut.

11. A method of determining the extent of damage to a vehicle body prior to its repair, said method comprising:
   locating an area on an undamaged side of said vehicle that is opposite from and corresponds to the damaged area;
   placing first and second string holders on said vehicle body for holding a first string in spaced relationship to said undamaged side, said string holders being positioned to hold said first string in a straight line which crosses the area of said undamaged side that corresponds to said damaged area, said first string being located a given distance from said vehicle center line;
   pulling a first string taut between said first and second string holders;
   placing third and fourth string holders on said vehicle body for holding a second string in spaced relationship to said damaged area, said third and fourth string holders being positioned to hold said second string away from said damaged area the same distance from the vehicle center line as said given distance;
   pulling a second string taut between said third and fourth string holders;
   measuring the distance between the damaged area of said vehicle body and said second string;
   measuring the distance between said corresponding area on said undamaged side and said string; and
   comparing the first and second measurements to determine the extent of the damage.

12. A method as set forth in claim 11, wherein said second placing step comprises placing said third and fourth string holders at locations on the damaged side of the vehicle corresponding to the locations of said first and second string holders on said undamaged side.

13. A method as set forth in claim 12, wherein said first and second strings are elastic to facilitate said pulling steps.

14. A method as set forth in claim 13, wherein at least one of said first and second string holders and at least one of said third and fourth string holders are provided with a magnetic base for facilitating said placing steps on a metal vehicle body.

15. A method as set forth in claim 13, wherein at least one of said first and second string holders and at least one of said third and fourth string holders are provided with a suction cup base for facilitating said placing steps on a nonmetallic vehicle body.

* * * * *